(12) United States Patent
Bagley et al.

(10) Patent No.: US 8,335,987 B2
(45) Date of Patent: Dec. 18, 2012

(54) INTERACTIVE PRODUCT CONFIGURATOR

(75) Inventors: Claire M. Bagley, Carlisle, MA (US);
Martin P. Plotkin, Concord, MA (US);
Michael Colena, Lowell, MA (US)

(73) Assignee: Oracle International Corporation,
Redwood Shores, CA (US)

( * ) Notice: Subject to any disclaimer, the term of this patent is extended or adjusted under 35 U.S.C. 154(b) by 892 days.

(21) Appl. No.: 12/187,837

(22) Filed: Aug. 7, 2008

(65) Prior Publication Data

US 2010/0037159 A1 Feb. 11, 2010

(51) Int. Cl.
*G06F 3/00* (2006.01)
(52) U.S. Cl. ........ 715/735; 715/701; 715/726; 715/739; 715/780; 715/807; 715/825; 715/859
(58) Field of Classification Search .................. 715/701, 715/702, 726, 735, 739, 780, 807, 825, 859
See application file for complete search history.

(56) References Cited

U.S. PATENT DOCUMENTS

| 6,983,421 | B1 * | 1/2006 | Lahti et al. ................ 715/763 |
| 7,039,602 | B1 * | 5/2006 | Kapadia et al. .......... 705/7.29 |
| 7,069,537 | B2 | 6/2006 | Lazarov |
| 7,693,699 | B2 * | 4/2010 | Singh et al. ................ 703/13 |
| 2002/0107749 | A1 | 8/2002 | Leslie et al. |
| 2002/0143653 | A1 | 10/2002 | DiLena et al. |
| 2002/0165701 | A1 * | 11/2002 | Lichtenberg et al. ........ 703/7 |
| 2005/0278271 | A1 | 12/2005 | Anthony et al. |
| 2009/0096621 | A1 * | 4/2009 | Ferlitsch .................. 340/635 |

OTHER PUBLICATIONS

SELECTICA, "Selectica Configuration" Solution Overview, 2005, Selectica, Inc., San Jose, CA.
ILOG, "ILOG Configurator, Powering online product and service configuration applications", Product Datasheet, Mar. 2005, ILOG.S.A.
ORACLE, "Oracle Configurator", Oracle Data Sheet, 2008, Oracle.
TACTON, "Tacton's Sales Configurator—Bridging the gap between engineering and sales for selling customized products.", http://www.tacton.com/templates/page_68.aspx?epslanguage=EN, 2007, Tacton Systems AB, Sweden.

* cited by examiner

*Primary Examiner* — William Bashore
*Assistant Examiner* — Mylinh Tran
(74) *Attorney, Agent, or Firm* — Squire Sanders (US) LLP

(57) ABSTRACT

A product configurator is based on a constraint network having a plurality of nodes. The product configurator, when it receives a user choice, determines which nodes in the constraint network are affected by the user choice. For each affected node, the product configurator stores the prior domain state of the node and associates the stored prior domain state with the user choice. Therefore, the nodes can be restored to their prior state if the user choice is later removed for any reason.

20 Claims, 8 Drawing Sheets

INTERACTIVE PRODUCT CONFIGURATOR

FIELD OF THE INVENTION

One embodiment is directed generally to computer interaction, and in particular to an interactive product configurator.

BACKGROUND INFORMATION

Many current products and services can be customized by a customer before being purchased. For example, computer systems typically include many possible options and configurations that can be specifically selected or configured by the customer. Other examples of highly configurable products and services include telephone switching systems, airplanes, automobiles, mobile telephone services, insurance policies, and computer software.

Product and service providers typically provide a "product configurator" that allows a customer or sales engineer to interact with a computer in order to customize and configure a solution by selecting among optional choices. Some known product configurators are constraint-based. For these configurators, constraints are enforced between optional choices, allowing the user to select the choices they want, while validating that the resulting set of user choices is valid.

Some known constraint-based configurators are not fully "interactive" because they function as batch systems in which all of the user choices are initially collected and then checked for validity as a batch. Other known configurators, when receiving a user choice, propagate the user choice through its constraint network. However, a problem arises in these known systems when a user wishes to remove or change prior selections during the "choosing" process. In known systems, this will likely cause a removal of all prior selections and likely requires a restart of the entire configuration process and then the re-assertion of all choices minus that choice that is to be removed. This causes the user to have to essentially start over, or at a minimum slows down the processing, thus diminishing the interactive experience. Further, these known systems do not easily show the user the effect of each selection on further selections since the configuration is not determined until all selections are made.

SUMMARY OF THE INVENTION

One embodiment is a product configurator that is based on a constraint network having a plurality of nodes. The product configurator, when it receives a user choice, determines which nodes in the constraint network are affected by the user choice. For each affected node, the product configurator stores the prior domain state of the node and associates the stored prior domain state with the user choice. Therefore, the nodes can be restored to their prior state if the user choice is later removed for any reason.

DETAILED DESCRIPTION

One embodiment is an interactive product configurator that efficiently stores prior node values when new user choices are received. This allows a user to add or remove a user choice during the configuration process without requiring a complete restart of the process by providing efficient backtracking.

Figure 1:
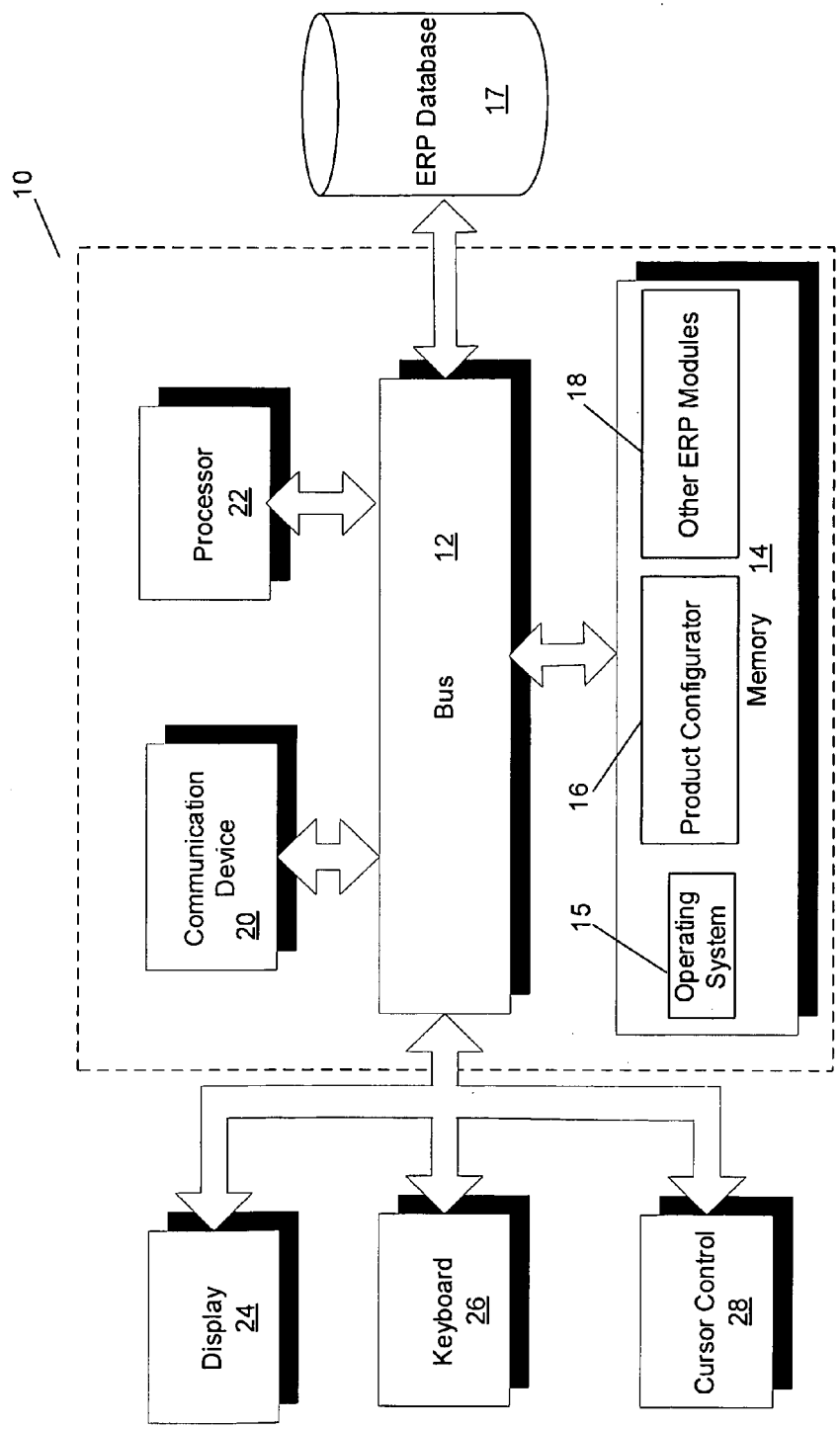
FIG. 1 is a block diagram of a system that can implement an embodiment of the present invention.

FIG. 1 is a block diagram of a system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a product configurator 16 that performs interactive product configuration as disclosed in more detail below. The modules further include other enterprise resource planning ("ERP") modules 18 of an ERP system that may interact with product configurator 16, such as a bill of material ("BOM") module and a customer relationship manager ("CRM") module. An ERP system is a computer system that integrates several data sources and processes of an organization into a unified system. A typical ERP system uses multiple components of computer software and hardware to achieve the integration. A unified ERP database 17, coupled to bus 12, is used to store data for the various system modules. In one embodiment, ERP modules 18 are part of the "Oracle E-Business Suite Release 12" ERP system from Oracle Corp. In other embodiments, product configurator 16 may be a stand-alone system and not integrated with an ERP system, or may be part of any other integrated system.

In one embodiment, product configurator 16 allows a user to interactively configure a product or service by choosing options. Product configurator 16 in one embodiment is constraint-based in that it solves a constraint problem to arrive at a solution (i.e., an appropriate and valid configuration). A constraint problem is a problem with a given set of variables, a given set of values or range of values (referred to as a "domain") for each variable, and a given set of constraints. Each constraint restricts the values, from the set of values, that may be simultaneously assigned to each variable of the set of variables. The solution is a combination of assignments of values to each variable that is consistent with all constraints.

A configuration "model" is created in order to implement a configurator. A model represents a generic framework of a solution, or of many possible solutions, to a problem, and includes a classification of associated model entities. The model entities are referred to as "nodes" and represent the domains of the constraint based system. A model may represent an apparatus, such as an automobile, with various option packages; a system such as a telecommunications network, with various hardware, software, protocol and service options; a suite of available services; a suite of software applications, etc. A constraint network is a series of nodes linked by constraints.

When a model is created and executed by product configurator 16, a user can interact with the model. The interaction in general involves the user being presented with a series of choices or items. Each item is represented by a variable in the underlying constraint system. Each variable has a domain, which is a range or set of possible values (e.g., integers between 0 and 10, the set of blue, red or green, etc.). As choices are made by the user, the domain may shrink. For example, if the configurator is for a car, the user may choose a sedan instead of a convertible. However, in the next choice, which is the color of the car, red may no longer be available because a sedan cannot be configured in red. If a user backtracks and decides not to choose a sedan, the color red should be restored as one of the color choices. In prior art configurator systems, a restart is typically required to restore the color red. In contrast, in one embodiment, the change of domains is efficiently tracked and stored so changes as a result of backtracking or other reasons can easily be undone.

Figure 2:
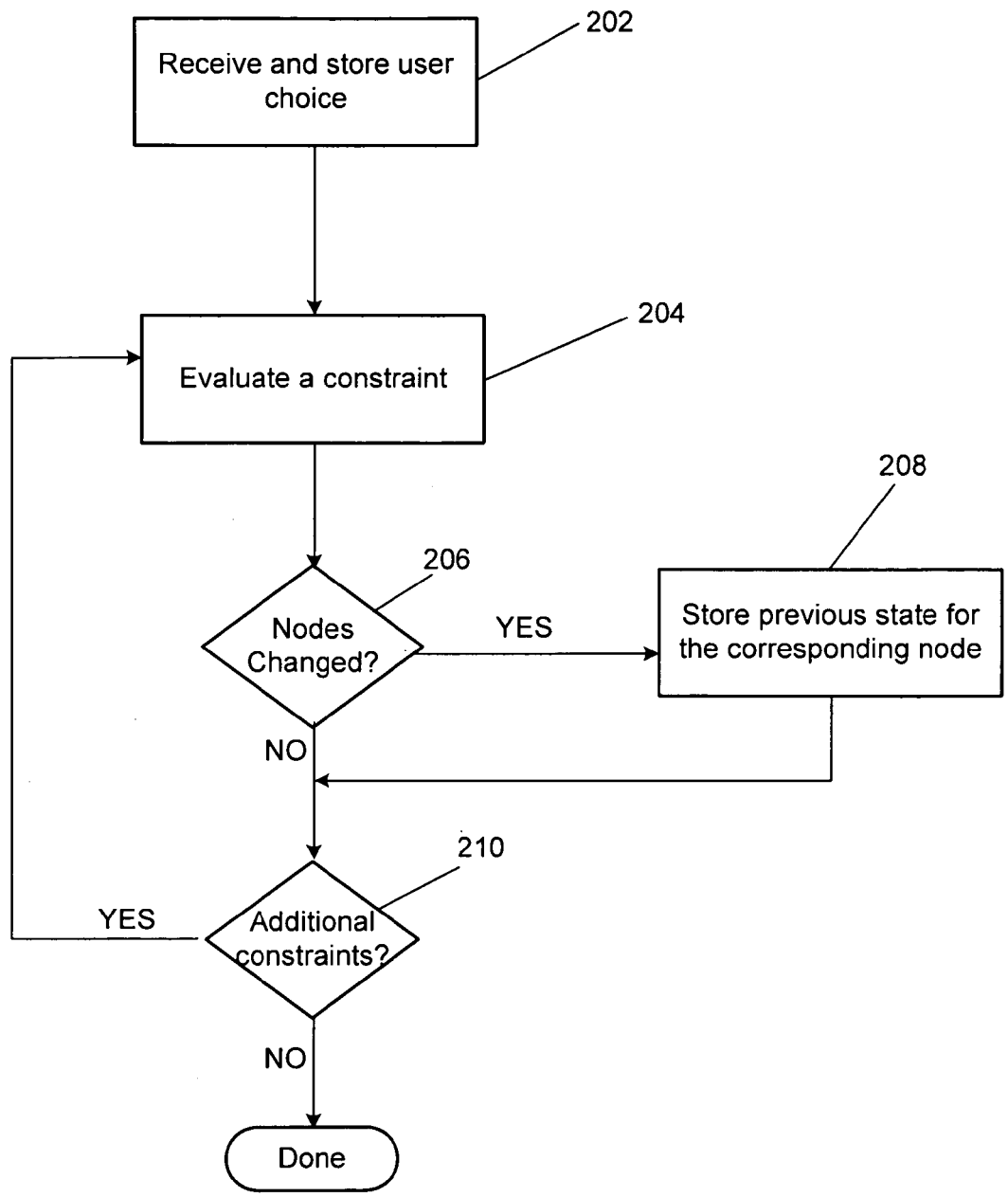
FIG. 2 is a flow diagram of the functionality of a product configurator when a user makes a choice when interacting with a configurator model in accordance with one embodiment.

FIG. 2 is a flow diagram of the functionality of product configurator 16 when a user makes a choice when interacting with a configurator model in accordance with one embodiment. In one embodiment, a user choice is any representation of an action by the user in the configurator user interface ("UI"). Examples of a user choice include clicking a checkbox, entering a number in a box, choosing a number or choice within a drop down box, etc. The user choices are added and managed in a manner that allows for efficient backtracking and/or negation. In one embodiment, the functionality of the flow diagram of FIG. 2, and FIGS. 4, 6 and 7 below, is implemented by software stored in memory or other computer readable or tangible medium, and executed by a processor. In other embodiments, the functionality can be performed by hardware, or any combination of hardware and software.

At 202, the user choice is received and stored. The user choice can be stored using any type of internal representation of the choice and in one embodiment is stored in memory 14. The user choice at 202 may cause one or more associated outward constraints in the constraint network to be affected (i.e., due to the propagation of the user choice throughout the constraint network), which may modify the associated node for each constraint.

At 204, the first/next outward constraint affected by the user choice at 202 is evaluated.

At 206, it is determined if the node for the constraint has changed. If so, at 208 the previous state for the node is stored and associated with the added user choice at 202.

At 210, if the node for the constraint has not changed, or after storing the previous state at 208, it is determined if there are additional constraints to evaluate from the user choice. If there are, the flow returns to 204. In this manner, the propagation of the entire constraint network as a result of the user choice 202 is evaluated and previous state of any nodes that have changed in response to the user choice is saved.

When the functionality of FIG. 2 is complete, for each node affected by propagation in the constraint network, the prior domain state is recorded and is associated with the current choice.

Figure 3:
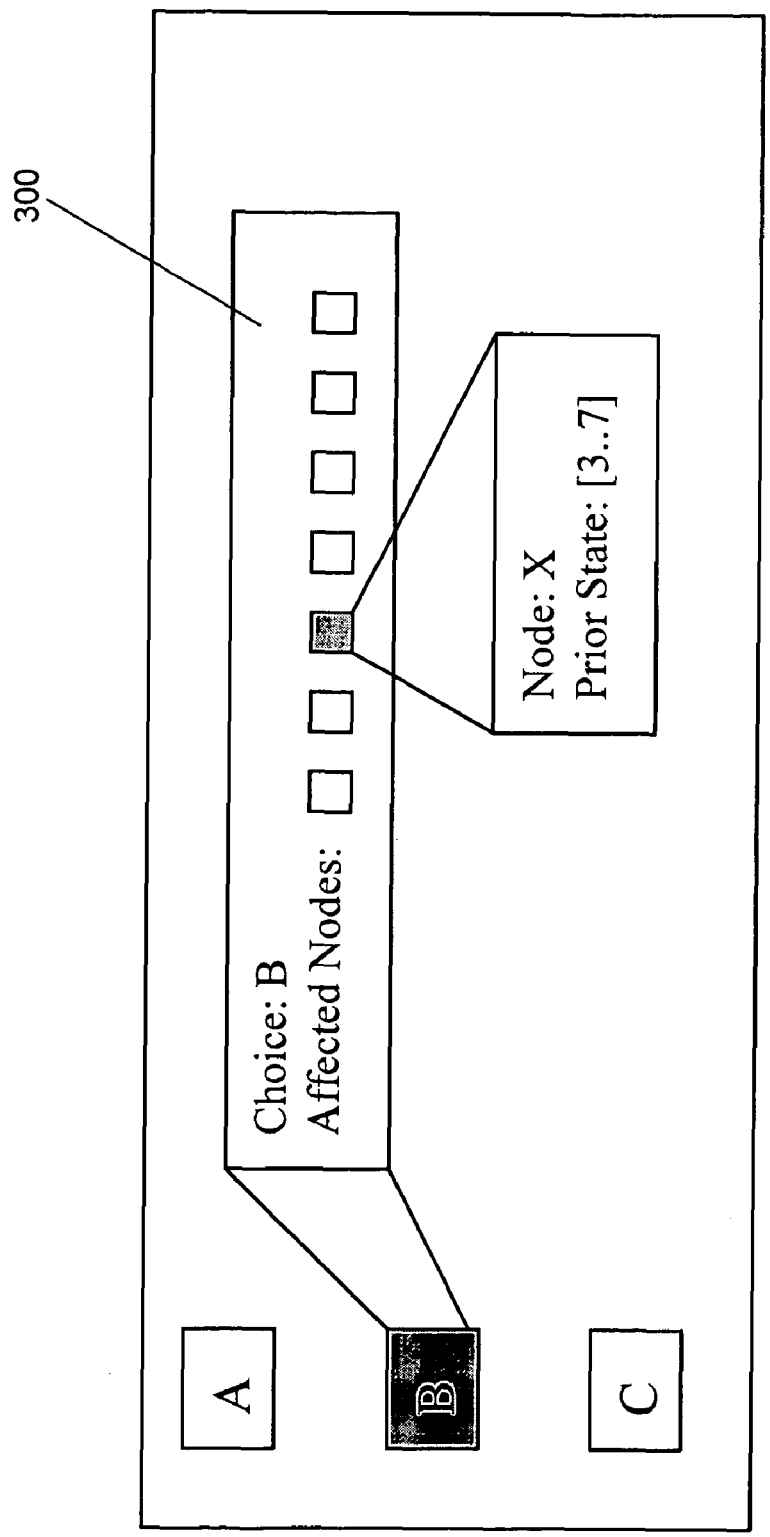
FIG. 3 graphically illustrates the functionality of FIG. 2 when a user choice is received in accordance with one embodiment.

FIG. 3 graphically illustrates the functionality of FIG. 2 when a user choice is received in accordance with one embodiment. As shown in the example of FIG. 3, a user has made a choice A, followed by choice B, followed by choice C. Each choice contains a set of affected nodes in the constraint network. For choice B, the affected nodes are shown in box 300. As shown, one of the affected nodes for choice B, node X, has a prior state of a numerical range of 3-7. This prior state is what is recorded at 208 of FIG. 2. In FIG. 3, having a numeric range that captures the state of a domain is a simplified example. In operation, other kind of domains may have different representations of the domain state, some much more complex than what is shown in FIG. 3.

Figure 4:
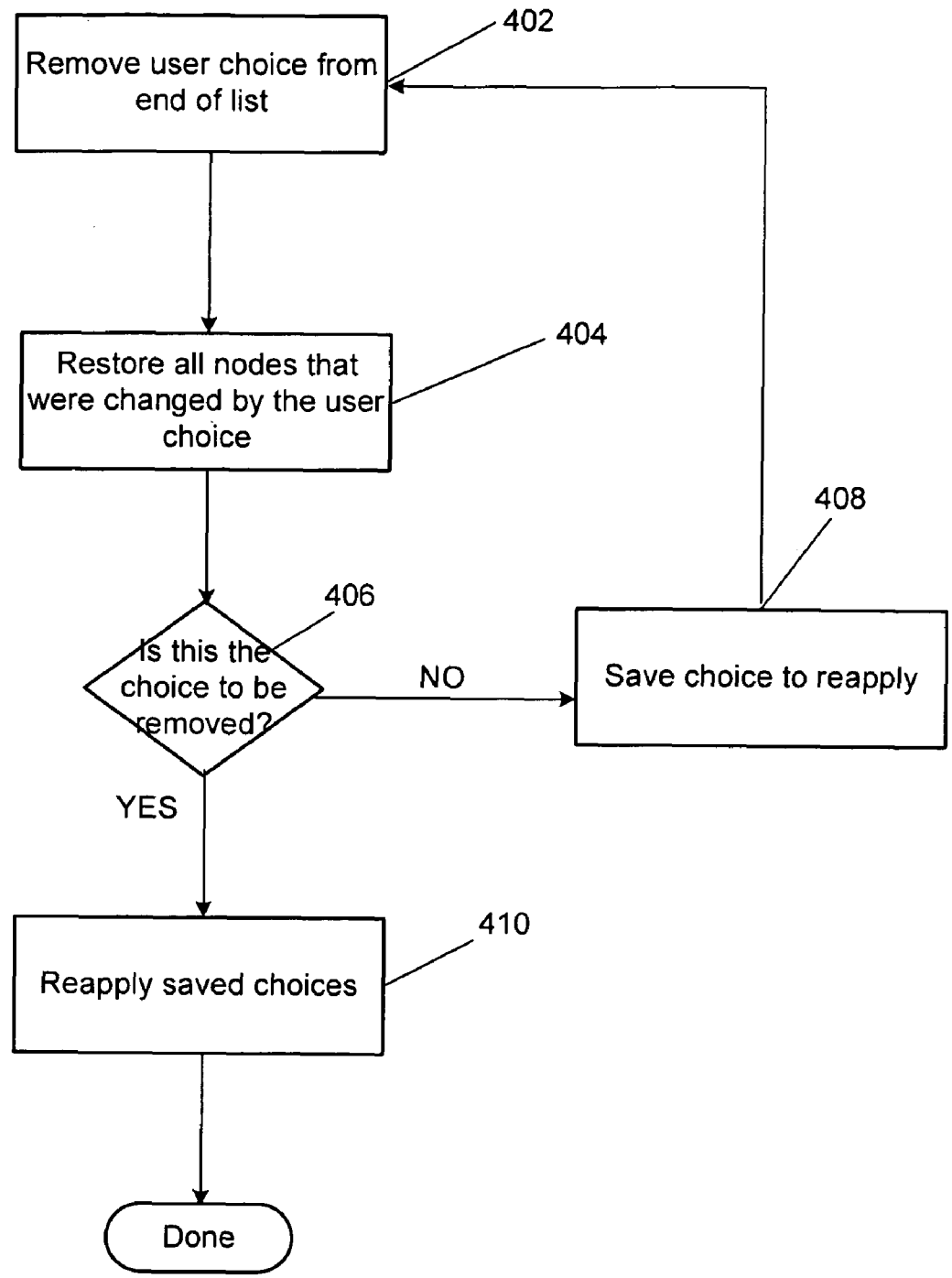
FIG. 4 is a flow diagram of the functionality of the product configurator when a user removes a prior choice among a series of choices (or just a single choice) in accordance with one embodiment.

Because for each user choice the prior state of each affected node is stored, embodiments of the present invention can efficiently remove prior user choices (i.e., backtracking by the user) without requiring a restart of the system. FIG. 4 is a flow diagram of the functionality of product configurator 16 when a user removes a prior choice among a series of choices (or just a single choice) in accordance with one embodiment. It is assumed that for every user choice made, the prior node states were stored as in FIG. 2. Product configurator 16 recognizes that the user is changing a previous selection that was made by the user in one embodiment through the user's interaction with the configurator (e.g., the user unchecks a previously checked box) so that the request comes directly from the user.

In one embodiment, the series of user choices are arranged in a chronological list, with the most recent user choice at the end of the list. At 402, the user choice from the end of the list is removed.

At 404, for the removed user choice at 402, all of the nodes that were changed by that user choice are restored. The previous state of the nodes were stored via the functionality of FIG. 2 when the user choice was received. The constraint network is therefore restored to its state before the choice was made.

At 406, it is determined if the choice is the target of the removal (i.e., is the choice that the user wants to remove). If the choice is not the target of removal, then the choice is saved in a list of choices to be reapplied at 408. Functionality then returns to 402, where the next choice from the end of the list is removed.

If the choice is the target of removal at 406, then at 410 all of the saved choices are reapplied incrementally, so that when each user choice is reapplied the functionality of FIG. 2 is executed.

Figure 5:
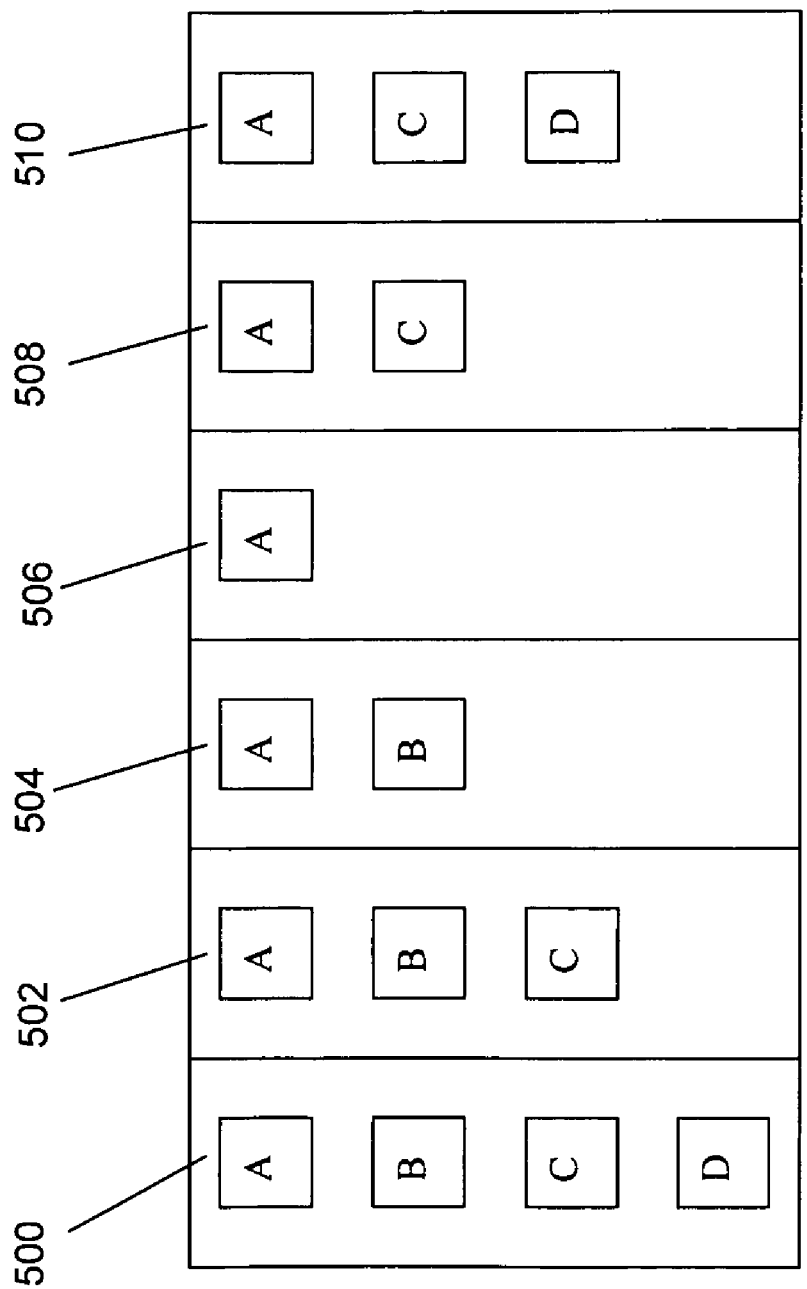
FIG. 5 graphically illustrates the functionality of FIG. 4 when removing a prior user choice from a list of user choices and while backtracking through the list in accordance to one embodiment.

FIG. 5 graphically illustrates the functionality of FIG. 4 when removing a prior user choice from a list of user choices and while backtracking through the list in accordance to one embodiment. In the example of FIG. 5, the user choices in chronological order, are A, B, C and D, as shown at 500. The user then decides to remove user choice B.

At 502, the user choice at the end of the list, choice D, is removed and the functionality of FIG. 4 is executed. When a choice is removed, the network is restored to the state it was in before the choice was made. Since choice D is not the choice to be removed, at 504 choice C is removed. Since choice C is not the choice to be removed, at 506 choice B is removed.

Choice B is the choice to be removed. Therefore, at 508, choice C is reapplied, and at 510, choice D is reapplied. When each choice is reapplied, the functionality of FIG. 2 is executed (i.e., the prior state of each affected node is saved).

Figure 6:
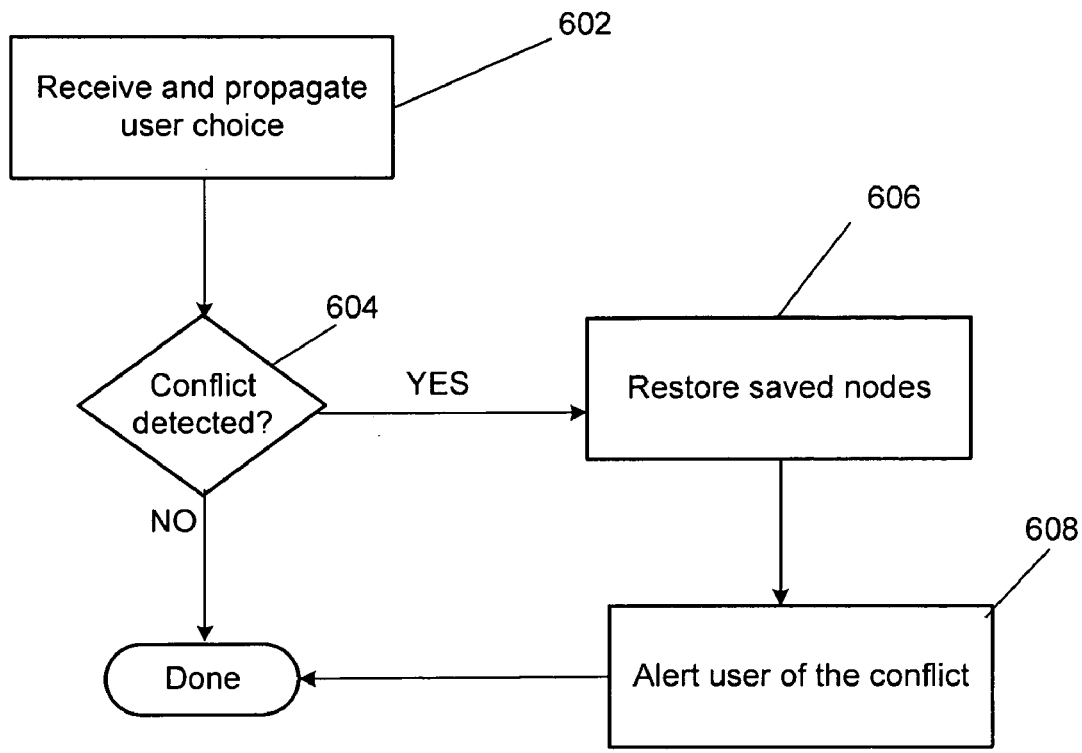
FIG. 6 is a flow diagram of the functionality of the product configurator when retracting an inconsistent choice in accordance with one embodiment.

A user may make an inconsistent choice when interacting with product configurator 16. For example, in configuring a computer system, a user may choose a large power cord that because of constraints in the network requires a large power supply. However, the user may have previously chosen a small power supply. Thus, the choice of the large power cord is inconsistent with the constraints and/or prior choices. In one embodiment, product configurator 16 will automatically retract the inconsistent choice, leaving the configurator in its previous consistent state and eliminating the need for a restart. The automatic retraction generates an internal "request" to remove the inconsistent choice. FIG. 6 is a flow diagram of the functionality of product configurator 16 when retracting an inconsistent choice in accordance with one embodiment.

At 602, the user choice is received and propagated throughout the constraint network.

At 604, it is determined if the user choice created a conflict or inconsistency in the constraint network.

If a conflict is determined at 604, at 606 the user choice is retracted and the previous state of the nodes of the network are restored. The previous state of the nodes was stored when the user choice was received and the functionality of FIG. 2 was executed.

At 608, the user is alerted of the conflict. For example, a message can be generated that states that "This choice is inconsistent with a prior choice and will be retracted".

In one embodiment, a user may wish to designate a user choice as having a higher priority than other choices. For example, in configuring a computer system, a user may select a specific printer, and specify that the printer selection is more important than any other configuration choice, or is more important than some specific choices, such as the computer system power supply. In response, one embodiment of product configurator 16 automatically removes any prior choices that may are inconsistent with the higher precedent user choice. This is achieved by incrementally backtracking and inserting the higher precedent choice before the lower precedent choices.

Figure 7:
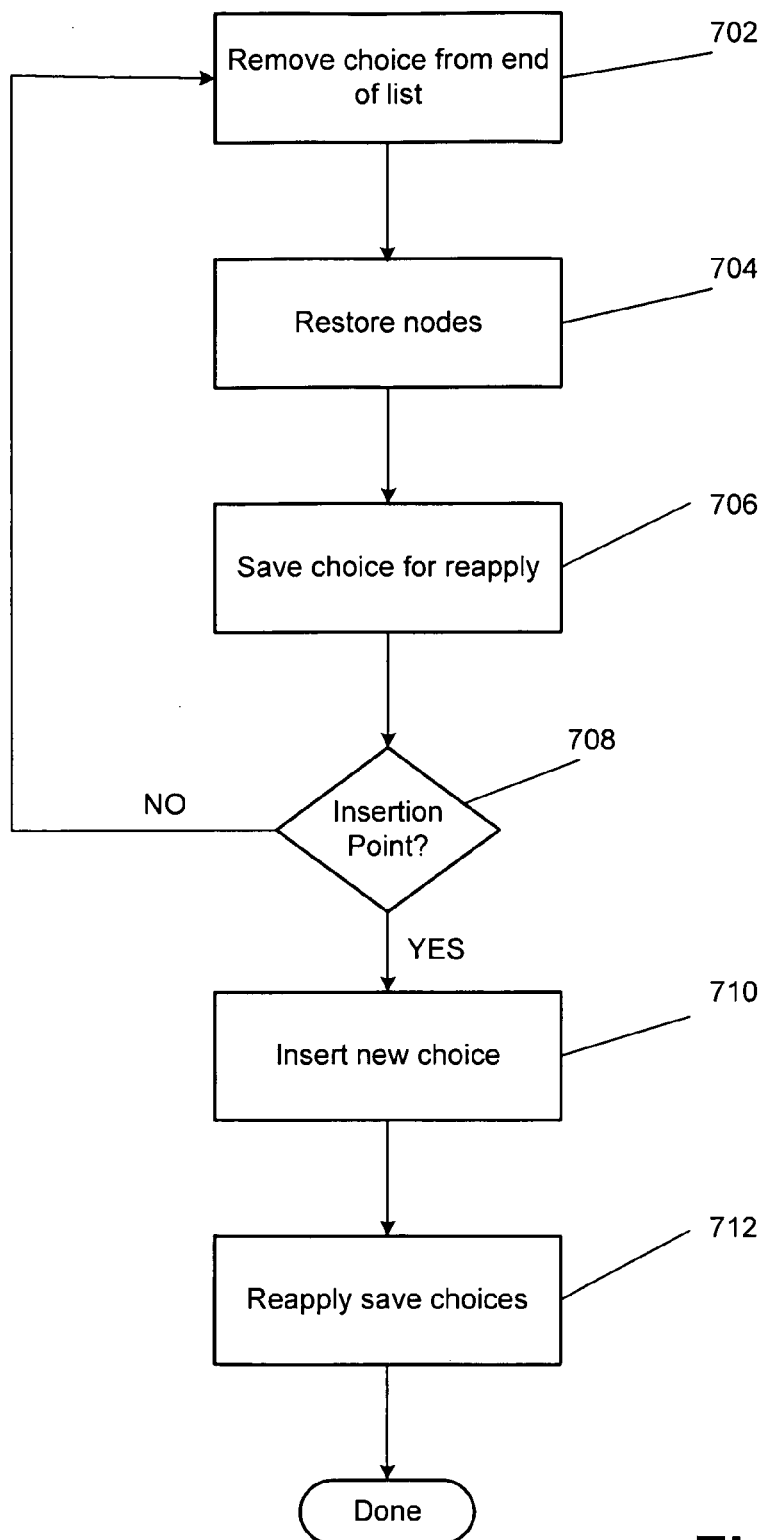
FIG. 7 is a flow diagram of the functionality of the product configurator when a user adds a new choice with a higher precedent than prior choices in accordance with one embodiment.

FIG. 7 is a flow diagram of the functionality of product configurator 16 when a user adds a new choice with a higher precedent than prior choices in accordance with one embodiment. The user may specify that a choice is more important than all other choices, or that it is more important than specific choices. The UI will allow the user to make a designation of the precedence at the time of the choice in one embodiment. The new choice with a higher precedent may automatically generate an internal "request" to remove a previous choice that has a lower precedent.

At 702, the user choice from the end of the current list of user choices is removed.

At 704, the nodes are restored so that the constraint network is in the state it was before the choice at 702 was made. The nodes can be restored because the functionality of FIG. 2 was executed when each user choice was received.

At 706, the choice is saved for reapply.

At 708, it is determined if the insertion point is reached. The insertion point is the point in the list of choices where the new choice having precedent should be inserted so that all choices below have lower precedence. If the insertion point is not reached, functionality returns to 702 where the next choice at the end of the list is removed.

If the insertion point is reached at 708, the new choice is inserted at 710.

At 712, the saved choices are reapplied. As each choice is reapplied, conflicts are determined in view of the new choice that was inserted. Therefore, any newly arisen conflict will prevent the saved choice from being reapplied since the saved choice has a lower precedent than the new choice.

Figure 8:
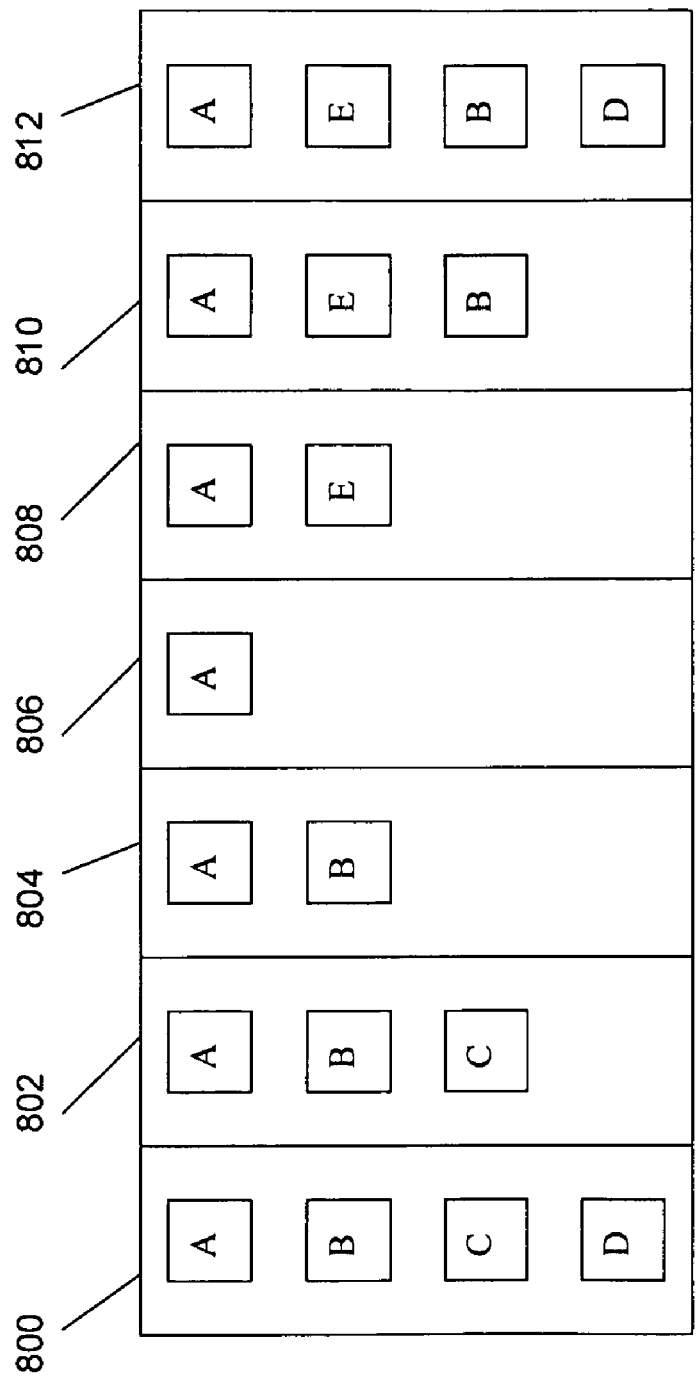
FIG. 8 graphically illustrates the functionality of FIG. 7 when inserting a new choice having higher precedent into a list of user choices in accordance to one embodiment.

FIG. 8 graphically illustrates the functionality of FIG. 7 when inserting a new choice having higher precedent into a list of user choices in accordance to one embodiment.

At 800, four user choices have been made, choices A, B, C, and D. The new choice, user choice E, is selected and the user specifies that it has precedence over or is more important than choices B, C and D.

At 802, choice D has been removed. At 804, choice C has been removed. At 806, choice B has been removed. Therefore, the choices have been incrementally backtracked to the insertion point.

At 808, new choice E is inserted at the insertion point (i.e., after choice A but before choices B-D).

At 810, choice B is reapplied. Choice C is then reapplied, but fails on reassertion due to conflicts with choice E. Finally, choice D is reapplied at 812. As a result, new choice E is inserted at the proper place on the list of choices and the user can continue making additional choices without requiring a restart.

As disclosed, embodiments of the configurator save the state of all affected nodes of a constraint network for every new received user choice. Therefore, if the user choice has to be removed for any reason such as a conflict, a decision to remove by a user, a newer higher precedent choice being received, etc., the constraint network can be easily restored to its prior state without requiring a restart. Therefore, the user's interactive experience is less disruptive.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of operating a product configurator that comprises a constraint network having a plurality of nodes, the method comprising:
   receiving a first user choice;
   propagating the first user choice throughout the constraint network;
   determining one or more first affected nodes of the plurality of nodes that are affected by the propagating;
   for each first affected node, storing a first prior domain state of the node and associating the stored first prior domain state with the first user choice, wherein the first prior domain state is a domain state of the first affected node before the propagating, and wherein the stored first prior domain state for each first affected node is different than the domain state of the first affected node after propagating;

wherein the first user choice is one of a plurality of user choices received from a user while interacting with the product configurator, and the determining and storing is performed after the first user choice is received and propagated and before a subsequent user choice of the plurality of user choices is propagated;

receiving and propagating subsequent user choices after the first user choice to generate the current state of the constraint network after each propagation, wherein each node in the current state comprises a current domain state;

while in the current state of the constraint network and after the subsequent user choices, receiving a request to remove the first user choice; and retrieving the stored first prior domain state for each first affected node and changing the current domain state of each first affected node to the first prior domain state.

2. The method of claim 1, wherein the nodes are affected based on a propagation of the first user choice through the constraint network.

3. The method of claim 1, further comprising:
receiving a request to remove the first user choice;
removing the first user choice; and
restoring the stored prior first domain state for each affected node.

4. The method of claim 3, further comprising:
receiving a second user choice before receiving the request to remove the first user choice;
determining one or more second affected nodes of the plurality of nodes that are affected by the second user choice; and
for each second affected node, storing a second prior domain state of the node and associating the stored second prior domain state with the second user choice.

5. The method of claim 4, further comprising:
removing the second user choice;
restoring the stored second prior domain state for each second affected node;
determining if the second user choice is a choice to be removed; and
if the second user choice is not the choice to be removed, saving the second user choice in a list of choices to reapply.

6. The method of claim 5, further comprising:
reapplying all choices in the list of choices to reapply.

7. The method of claim 3, wherein the request to remove the first user choice is generated directly from the user.

8. The method of claim 3, wherein the request to remove the first user choice is generated because another user choice is inconsistent with the first user choice.

9. The method of claim 3, wherein the request to remove the first user choice is generated because another user choice has a higher precedence than the first user choice.

10. The method of claim 9, further comprising:
generating a message that alerts the user that the first user choice is removed.

11. A non-transitory computer readable medium having instructions stored thereon that, when executed by a processor, causes the processor to operate a product configurator, the instructions comprising logic for:

defining a constraint-based network having a plurality of nodes;
receiving a first user choice;
propagating the first user choice throughout the constraint network;
determining one or more first affected nodes of the plurality of nodes that are affected by the first propagating;
for each first affected node, storing a first prior domain state of the node and associating the stored first prior domain state with the first user choice, wherein the first prior domain state is a domain state of the first affected node before the propagating, and wherein the stored first prior domain state for each first affected node is different than the domain state of the first affected node after propagating;

wherein the first user choice is one of a plurality of user choices received from a user while interacting with the product configurator, and the determining and storing is performed after the first user choice is received and propagated and before a subsequent user choice of the plurality of user choices is propagated;

receiving and propagating subsequent user choices after the first user choice to generate the current state of the constraint network after each propagation, wherein each node in the current state comprises a current domain state;

while in the current state of the constraint network and after the subsequent user choices, receiving a request to remove the first user choice; and retrieving the stored first prior domain state for each first affected node and changing the current domain state of each first affected node to the first prior domain state.

12. The computer readable medium of claim 11, wherein the nodes are affected based on a propagation of the first user choice through the constraint network.

13. The computer readable medium of claim 11, further comprising:
receiving a request to remove the first user choice;
removing the first user choice; and
restoring the stored prior first domain state for each affected node.

14. The computer readable medium of claim 13, wherein the request to remove the first user choice is generated directly from the user.

15. The computer readable medium of claim 13, wherein the request to remove the first user choice is generated because another user choice is inconsistent with the first user choice.

16. A system for configuring a product, the system comprising:
a processor;
a computer readable medium coupled to the processor;
means for defining a constraint-based network having a plurality of nodes:
means for receiving a first user choice;
means for propagating the first user choice throughout the constraint network;
means for determining one or more first changed nodes of the plurality of nodes that are changed by the propagating;
for each first changed node, means for storing a first prior domain state of the node and associating the stored first prior domain state with the first user choice, wherein the first prior domain state is a domain state of the first affected node before the propagating, and wherein the stored first prior domain state for each first affected node is different than the domain state of the first affected node after propagating;

wherein the first user choice is one of a plurality of user choices received from a user while interacting with the product configurator, and the determining and storing is performed after the first user choice is received and propagated and before a subsequent user choice of the plurality of user choices is propagated;

receiving and propagating subsequent user choices after the first user choice to generate the current state of the constraint network after each propagation, wherein each node in the current state comprises a current domain state;

while in the current state of the constraint network and after the subsequent user choices, receiving a request to remove the first user choice; and retrieving the stored first prior domain state for each first affected node and changing the current domain state of each first affected node to the first prior domain state.

17. The system of claim 16, wherein the nodes are changed based on a propagation of the first user choice through the constraint network.

18. The system of claim 16, further comprising:
means for receiving a request to remove the first user choice;
means for removing the first user choice; and
means for restoring the stored prior first domain state for each changed node.

19. A product configurator comprising:
a processor; and
a memory coupled to the processor;
wherein the memory stores instructions that when executed by the processor comprise:
a constraint-based network having a plurality of nodes;
a user interface that receives a first user choice;
propagating the first user choice throughout the constraint network;
a determination of one or more first changed nodes of the plurality of nodes that are changed by the propagating;
for each first changed node, storing a domain state of the node before being changed and associating the stored domain state with the first user choice, wherein the first prior domain state is a domain state of the first affected node before the propagating, and wherein the stored first prior domain state for each first affected node is different than the domain state of the first affected node after propagating;

wherein the first user choice is one of a plurality of user choices received from a user while interacting with the product configurator, and the determining and storing is performed after the first user choice is received and propagated and before a subsequent user choice of the plurality of user choices is propagated;

receiving and propagating subsequent user choices after the first user choice to generate the current state of the constraint network after each propagation, wherein each node in the current state comprises a current domain state;

while in the current state of the constraint network and after the subsequent user choices, receiving a request to remove the first user choice; and retrieving the stored first prior domain state for each first affected node and changing the current domain state of each first affected node to the first prior domain state.

20. The product configurator of claim 19, further comprising:
a database coupled to the processor that stores enterprise resource planning data.

* * * * *